United States Patent
Maruyama

(10) Patent No.: US 6,990,582 B2
(45) Date of Patent: Jan. 24, 2006

(54) AUTHENTICATION METHOD IN AN AGENT SYSTEM

(75) Inventor: Toshihiro Maruyama, Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 833 days.

(21) Appl. No.: 10/108,544

(22) Filed: Mar. 29, 2002

(65) Prior Publication Data

US 2002/0144118 A1    Oct. 3, 2002

(30) Foreign Application Priority Data

Apr. 2, 2001   (JP)   ............................ P2001-103692

(51) Int. Cl.
*H04L 9/00* (2006.01)
*H04L 9/32* (2006.01)
*G06F 11/30* (2006.01)
*G06F 12/14* (2006.01)

(52) U.S. Cl. ...................... 713/170; 713/168; 713/172; 726/30; 380/45

(58) Field of Classification Search ................ 713/168, 713/170, 172, 200, 202; 726/30; 380/45
See application file for complete search history.

(56) References Cited

FOREIGN PATENT DOCUMENTS

JP    2000-020443    1/2000

OTHER PUBLICATIONS

Varadharajan, Vijay, Security Enhanced Mobile Agents, Conference on Computer Communications Security, Proceedings on the 7th Conference and Communications Security, p. 200-209, 2000.*
"Introduction to Public-Key Cryptography", Netscape Publication (http://developer.netscape.com/docs/manuals/security/pkin/contents.htm). Document most recently updated on Oct. 9, 1998.

* cited by examiner

*Primary Examiner*—Gilberto Barron, Jr.
*Assistant Examiner*—Brandon Bludau
(74) *Attorney, Agent, or Firm*—Nath & Associates PLLC; Gary M. Nath; Gregory B. Kang

(57) ABSTRACT

A sending server that sends an agent and a receiving server that receives the agent share a common key. The sending server double-encrypts an agent processing module and transfers to the receiving server an agent storage container that contains the agent processing module, an agent processing module decryption processing program, a receiving server authentication processing program, authentication object information, and a public key. The agent and the receiving server authenticate each other in the receiving server.

6 Claims, 8 Drawing Sheets

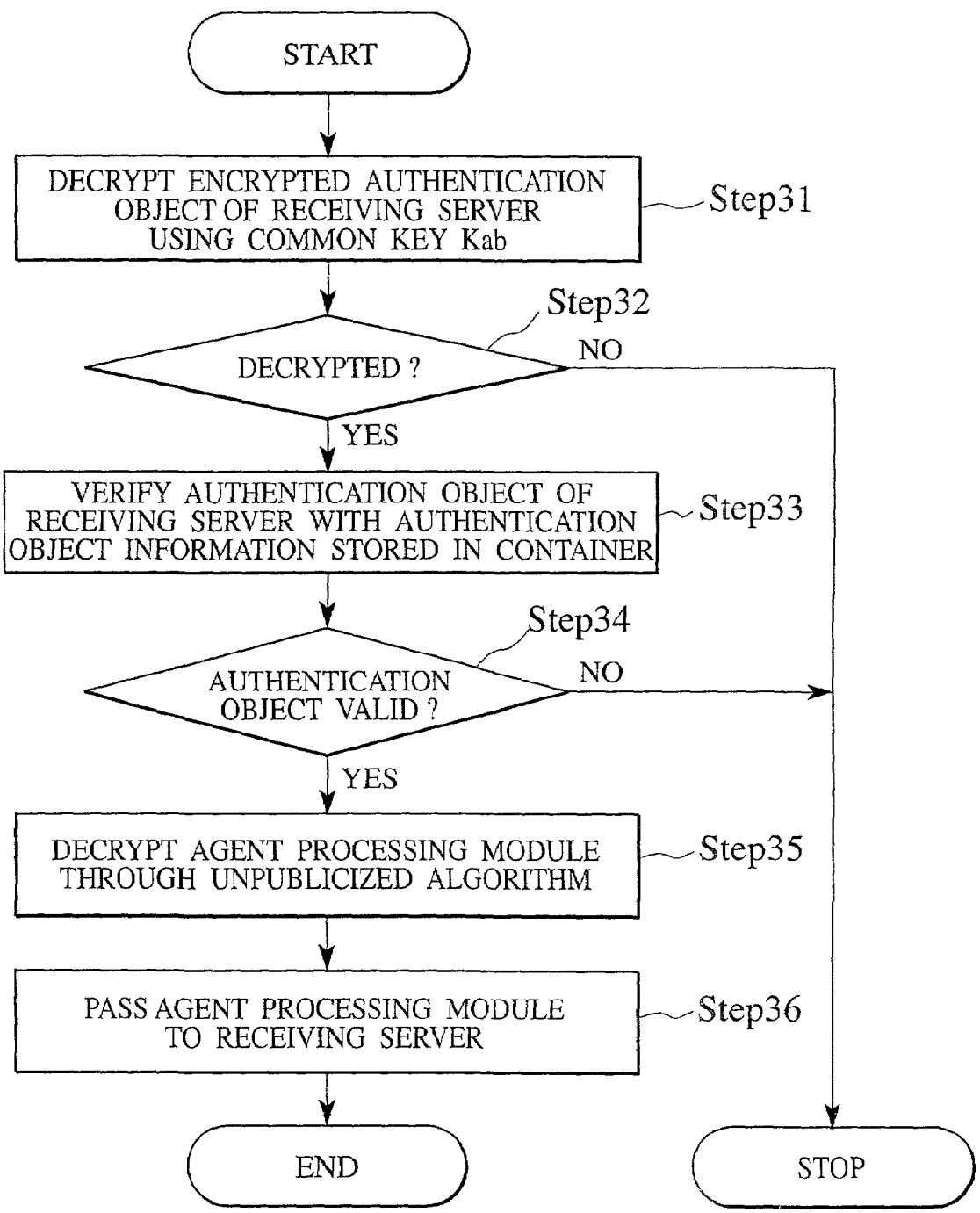

AUTHENTICATION METHOD IN AN AGENT SYSTEM

BACKGROUND OF THE INVENTION

1. Field of the Invention

The present invention relates to an authentication method for use in an agent system that moves on a network autonomically.

2. Description of the Related Art

Conventionally, various authentication technologies have been developed as a method for security protection.

For example, the remote procedure call function (RPC: Remote Procedure Call) used widely in a UNIX-based distribution system provides the user with the user authentication function such as the one shown in FIG. 1.

Before communication begins, client A and server B share a common key Kab, which is used in DES (Data Encryption Standard) encryption, in accordance with the DH system (Diffie-Hellman public key distribution system) as shown in FIG. 1. More specifically, client A generates the common key Kab from the publicized server B's public key Kb' and the client A's own private key Ka. Server B generates the common key Kab from the publicized client A's public key Ka' and the server B's own private key Kb.

Client A generates a character string (net name) representing the sender, generates a session key K (random number), and DES-encrypts (Fe) the timestamp T using the generated session key K.

In addition, client A DES-encrypts (Fe) the common key Kab using the session key K and sends the network name, encrypted session key K, and encrypted timestamp T to server B as authentication information.

Server B DES-decrypts (Fd) the encrypted session key K included in the received authentication information using the common key Kab and, in addition, DES-decrypts (Fd) the encrypted timestamp T included in the authentication information using the session key K. Server B compares the decrypted timestamp T with the current time of day. Server B allows access of the net name if the difference is within an allowable range, but rejects access if the difference is out of an allowable range.

An agent that moves on the network in autonomically, the so-called a mobile agent, is a software product that moves on the network. It moves to a location where necessary resources are available, selects an action according to a change in the environment, and performs operation autonomically to achieve the object. A mobile agent like this is used in a distributed system. For example, an agent processing module, programmed based on a user's requirement, leaves the user's computer, moves around a plurality of distributed servers on the network according to its judgment to collect user-desired information, and returns to the user's computer.

When the conventional authentication method described above is applied to such an agent that moves autonomically, a destination server usually authenticates the agent that has visited. That is, the destination server verifies the authentication information brought by the agent. The agent can execute processing in the server if authenticated, but not if not authenticated.

For the agent to authenticate the destination server, it is necessary, after the server's authentication processing described above is performed, that the server decrypts the agent's processing module and then the decrypted processing module of the agent authenticates the server. In this case, if the server is malignant, the decrypted processing module of the agent becomes defenseless and the contents of the processing module are exposed to analysis and alteration.

In addition, when the agent authenticates the destination server, the server must pass its authentication information to the agent. If the agent is malignant, there is a possibility that illegal processing such as an illegal access or a destructive action may be included into the authentication processing part of the server.

Furthermore, server's authentication processing for the agent and agent's authentication processing for the server, if executed individually and serially, increase the processing time and the load.

SUMMARY OF THE INVENTION

In view of the foregoing, it is an object of the present invention to provide an authentication method, for use in an agent system moving on a network autonomically, that allows a destination server to authenticate an agent and, at the same time, allows an agent to authenticate a destination server, and that performs authentication easily and reliably.

To solve the above problems, there is provided an authentication method for use in an agent system including an agent processing module that leaves user's control and autonomically moves on a network and that executes predetermined processing on a destination server, wherein, (1) a sending server that sends the agent processing module
   (a) generates a common key from a private key owned by the sending server and a public key of a receiving server that receives the agent processing module,
   (b) encrypts the agent processing module, which will be sent, using the generated common key,
   (c) double-encrypts the encrypted agent processing module using an unpublicized encryption method,
   (d) stores the double-encrypted agent processing module, a decryption processing program that decrypts the agent processing module encrypted by the unpublicized encryption method, pre-distributed authentication object information on an authentication object of the receiving server, an authentication object verification processing program that verifies the authentication object of the receiving server, and the common key into an agent storage container defined in container information pre-distributed in the receiving server, and
   (e) sends the agent storage container to the receiving server, and (2) the receiving server
   (a) receives the agent storage container sent by the sending server,
   (b) verifies the received agent storage container based on the pre-distributed container information,
   (c) generates a common key from a private key owned by the receiving server and a public key of the sending server that sends the agent processing module,
   (d) encrypts the authentication object of the receiving server using the generated common key,
   (e) passes the encrypted authentication object to the agent storage container and requests the agent storage container to verify the authentication object, to decrypt the agent processing module encrypted by the unpublicized encryption method, and to return the decrypted agent processing module, and
   (f) decrypts the agent processing module, which is passed from the agent storage container, using the common key.

According to the present invention, the receiving server that receives an agent can make two checks, that is, (1) verify the validity of the agent storage container and (2) verify the validity of the agent processing module, easily and reliably, thus preventing an illegal access even if a malignant agent visits the server.

In a preferred embodiment of the present invention, the authentication object verification processing program in the agent storage container decrypts the encrypted authentication object of the receiving server using the common key in the agent storage container, the encrypted authentication object being passed from the receiving server, and verifies the decrypted authentication object using the authentication object information in the agent storage container and if the decrypted authentication object matches the authentication object information in the agent storage container as a result of the verification, the decryption processing program in the agent storage container decrypts the agent processing module in the agent storage container using the unpublicized encryption method and passes the decrypted agent processing module to the receiving server.

The embodiment allows the destination server to authenticate the agent, and the agent to authenticate the destination server, each other. The agent processing module is double-encrypted and, until the agent is authenticated by the destination server, the agent processing module remains encrypted by an unpublicized encryption method. Therefore, even if the agent visits a malignant server, security is maintained.

In a preferred embodiment of the present invention, if the encrypted authentication object of the receiving server cannot be decrypted using the common key in the agent storage container, the authentication object verification processing program stops processing.

In a preferred embodiment of the present invention, if the decrypted authentication object does not match the authentication object information in the agent storage container as a result of the verification, the authentication object verification processing program stops processing.

In a preferred embodiment of the present invention, if the receiving server that has passed the encrypted authentication object to the agent storage container cannot obtain the agent processing module from the agent storage container, the receiving server stops processing.

In a preferred embodiment of the present invention, if the receiving server cannot decrypt the agent processing module, which is passed from the agent storage container, using the common key, the receiving server stops processing.

The nature, principle and utility of the invention will become more apparent from the following detailed description when read in conjunction with the accompanying drawings.

BRIEF DESCRIPTION OF THE DRAWINGS

In the accompanying drawings:

FIG. 8 is a processing flowchart showing the processing operation procedure of an agent storage container in the receiving server shown in FIG. 6.

DESCRIPTION OF THE PREFERRED EMBODIMENTS

An embodiment of an authentication method in an agent system according to the present invention will be described in detail below with reference to the drawings.

A server included in the agent system in this embodiment uses information processing devices that can execute the processing described below. Those information processing devices include so-called general-purpose computers, workstations, and personal computers, as well as network connectable information processing devices such as digital home electric appliances, portable terminals such as PDAs, and cellular phones. It should be noted that the processing described below may be performed by a software product and that a part of processing may be done on a hardware unit.

In this specification, a network refers to a closed network such as a LAN (Local Area Network) and an open network such as a WAN (Wide Area Network) and the Internet.

Figure 1:
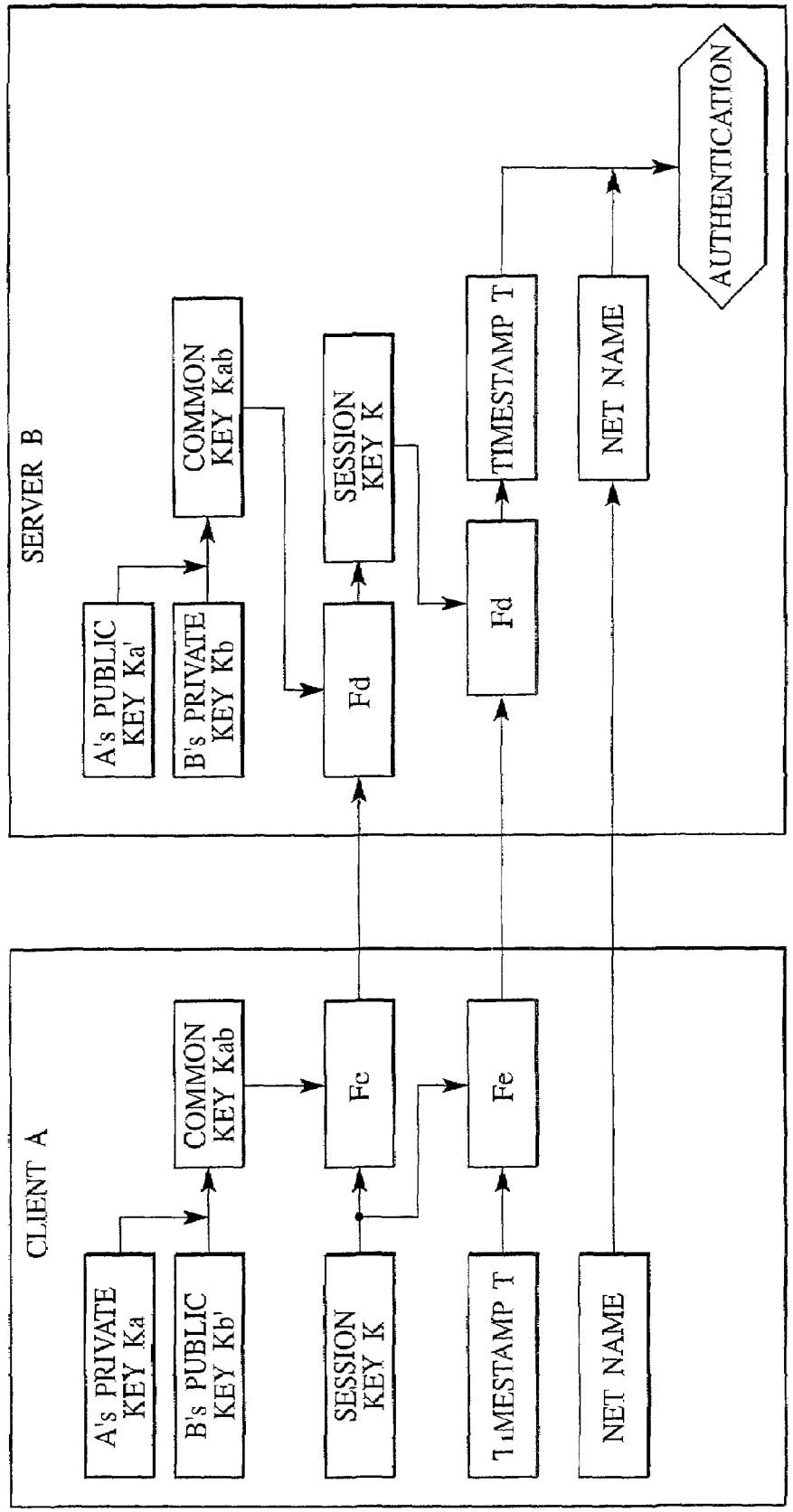
FIG. 1 is a diagram showing the overview of the conventional RPC authentication method.
Figure 2:
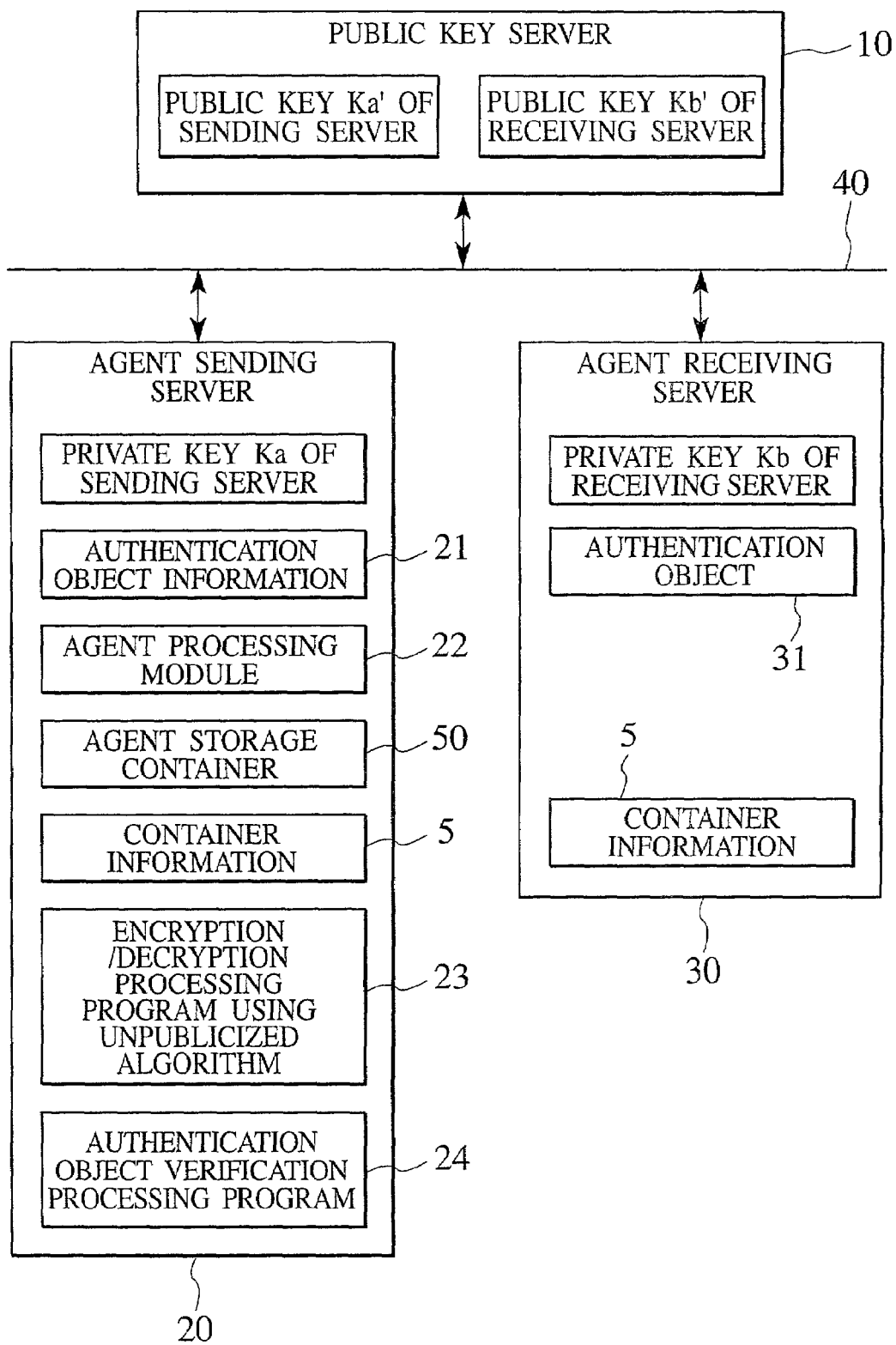
FIG. 2 is a block diagram schematically showing the overview of an agent system to which an authentication method according to the present invention is applied.

FIG. 2 is a diagram schematically showing the overview of the agent system to which the authentication method according to the present invention is applied. Referring to the figure, the agent system comprises a sending server 20 that sends an agent, a receiving server 30 that receives the agent sent by the sending server 20, and a public key server 10 that holds the public keys of the servers and makes those keys publicly available. All components are connected via a network 40.

The public key server 10 holds and publicizes the public key Ka' of the sending server 20 and the public key Kb' of the receiving server 30 and, upon request from a server, provides the requesting server with a public key. Instead of installing the public key server 10 to hold and publicize public keys, a public key may be passed directly to a partner server.

The sending server 20 that sends an agent comprises the private key Ka of the sending server 20, authentication object information 21 used by the agent to authenticate the receiving server 30, an agent processing module 22 that is sent, an agent storage container 50 in which the agent processing module 22 and so on are stored, container information 5 that defines the agent storage container 50, an encryption processing program 23 that double-encrypts the agent processing module using an unpublicized algorithm, and an authentication object verification processing program 24 used by the agent to authenticate the receiving server 30 at the destination of the agent.

The receiving server 30 that receives an agent comprises a private key Kb of the receiving server 30, an authentication object 31 used by the visiting agent to authenticate the receiving server 30, and container information 5 distributed in advance.

The container information 5 distributed to the receiving server 30 in advance defines the name and the execution address of the processing program and so on stored in the agent storage container 50. The processing program stored in the agent storage container 50 may be retrieved for execution based on the definition information stored in the container definition information 5.

Various types of data items are possible as the entries of the authentication object information 21 distributed to the sending server 20. For example, when the authentication object 31 of the receiving server 30 is in the program format, the authentication object information 21 distributed to the sending server 20 includes such items as a processing program name, a module name, an execution address and so on. When the authentication object 31 of the receiving server 30 is in the text format or the binary format, the authentication object information 21 distributed to the sending server 20 includes data items such as a list of variable names, an address at which information is stored, and so on.

Figure 3:
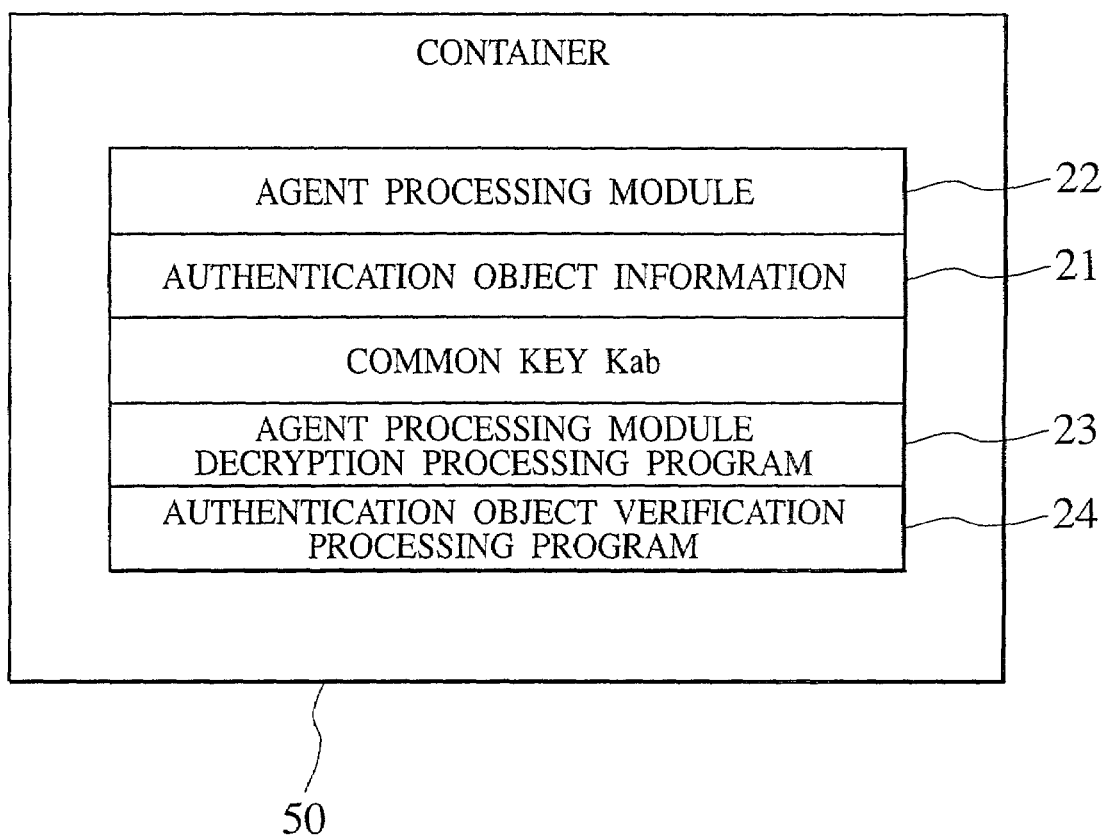
FIG. 3 is a diagram showing an example of the configuration of an agent storage container in which an agent processing module is stored.

FIG. 3 is a diagram showing an example of the configuration of the agent storage container 50 that contains the agent processing module 22 and soon. Referring to FIG. 3, the agent storage container 50 contains the agent processing module 22 that is double-encrypted, decryption processing program 23 that decrypts the agent processing module 22 encrypted using an unpublicized encryption method, pre-distributed authentication object information 21 on the authentication object 31 of the receiving server, authentication object verification processing program 24 used to verify the authentication object 31 of the receiving server, and a common key Kab.

Figure 4:
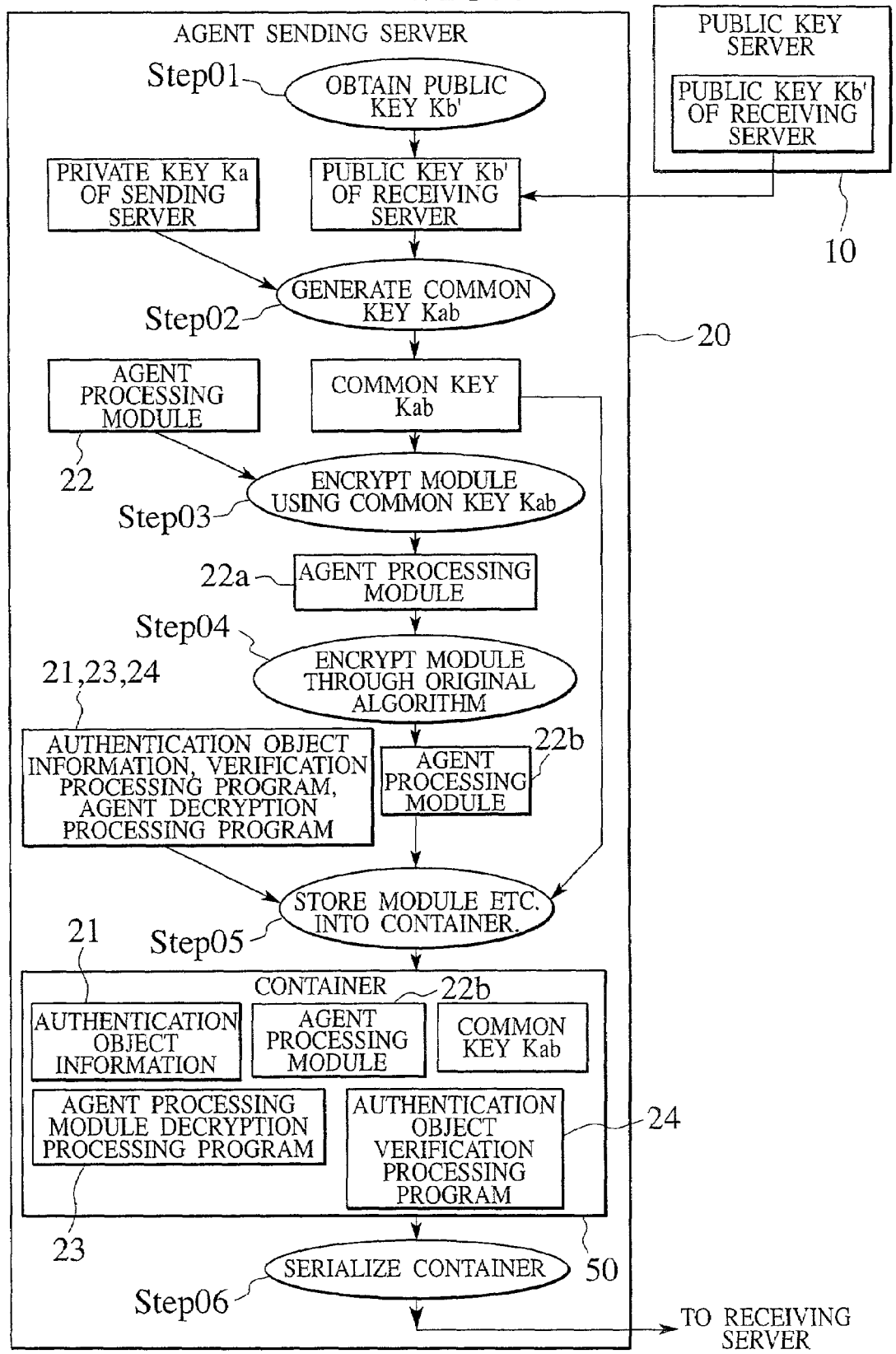
FIG. 4 is an operation flowchart schematically showing the processing operation of a sending server that sends an agent.
Figure 5:
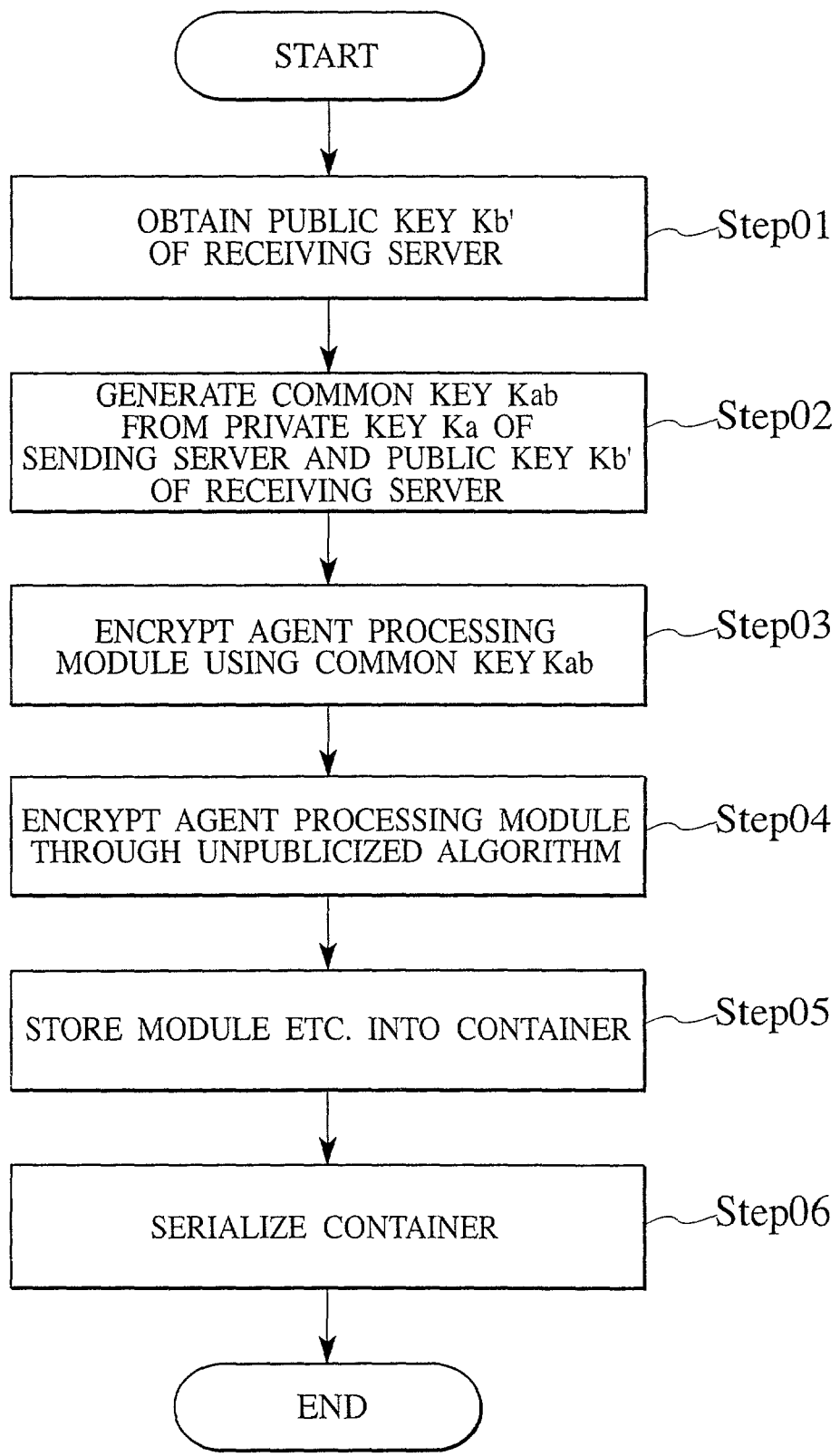
FIG. 5 is a processing flowchart showing the processing operation procedure of the sending server that sends the agent shown in FIG. 4.

FIG. 4 is a diagram schematically showing the processing operation of the sending server 20 that sends an agent, and FIG. 5 is a flowchart showing the processing flow.

The sending server 20 obtains the public key Kb' of the receiving server 30 from the public key server 10 in advance (Step 01) and, with the use of the DH system, generates the common key Kab from the obtained public key Kb' of the receiving server 30 and the private key Ka of the sending server 20 (Step 02).

Next, the sending server 20 uses the generated common key Kab to DES-encrypt the agent processing module 22 that will be sent (Step 03).

In addition, the sending server 20 uses the common key Kab to double-encrypt the DES-encrypted agent processing module 22a through an encryption algorithm not open to the receiving server 30 (Step 04). The encryption algorithm used in this step may be any existing encryption algorithm, for example, FEAL (Fast Data Encipherment Algorithm), as long as the receiving server 30 is not aware of which algorithm is used. Instead of an encryption algorithm, a data compression algorithm may also be used.

Next, the sending server 20 stores the agent processing module 22b double-encrypted by the DES algorithm and the unpublicized algorithm, the decryption processing program 23 used to decrypt the agent processing module 22 encrypted by the unpublicized encryption method, the authentication object information 21 on the authentication object 31 of the receiving server, the authentication object verification processing program 24 used to verify the authentication object 31 of the receiving server, and the common key Kab (Step 05) into the agent storage container 50. In addition, the sending server 20 serializes the agent storage container 50 to send the agent storage container 50 in the executable state and sends it to the receiving server 30 (Step 06).

Figure 6:
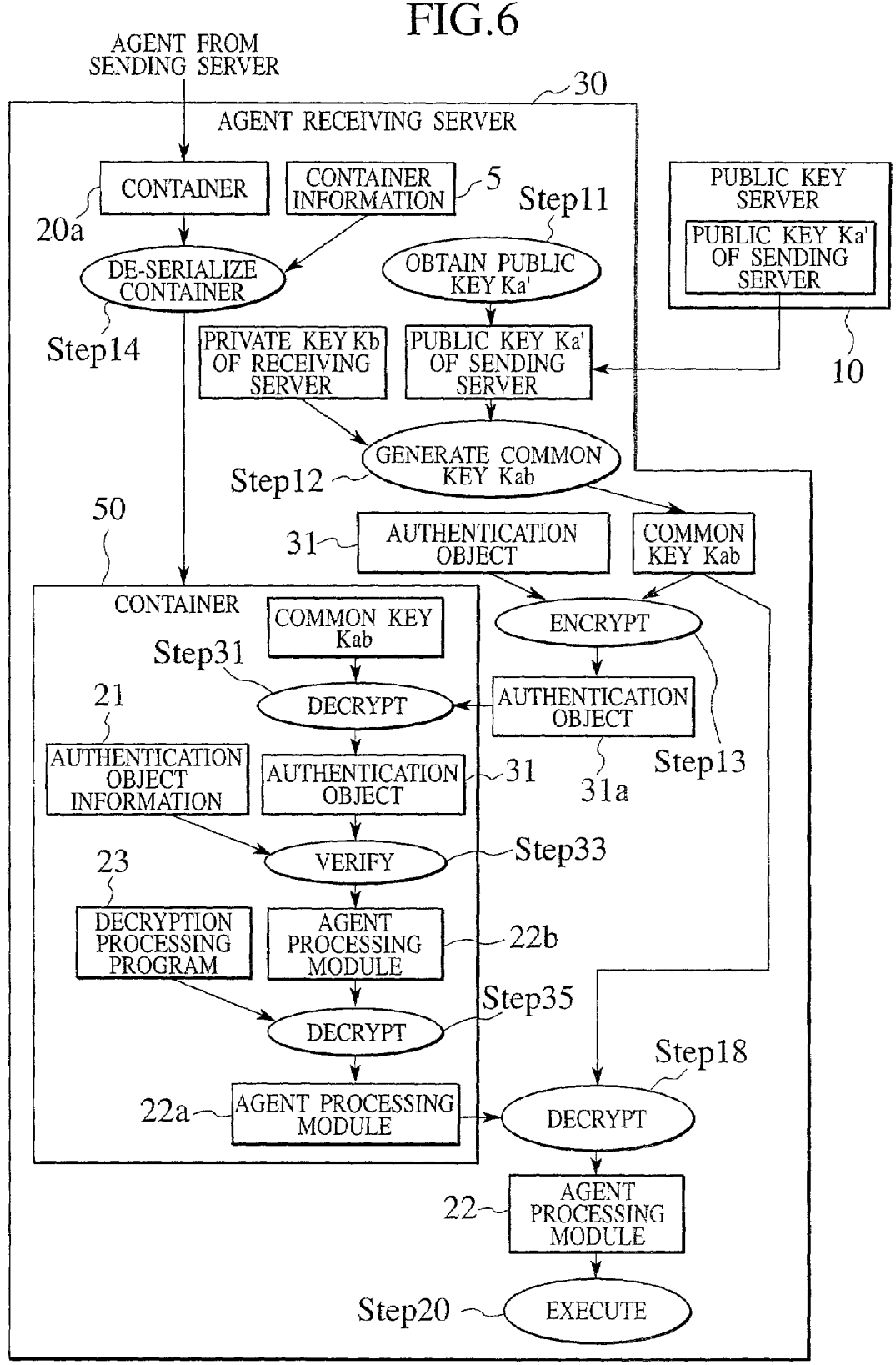
FIG. 6 is an operation flowchart schematically showing the processing operation of a receiving server that receives the agent.
Figure 7:
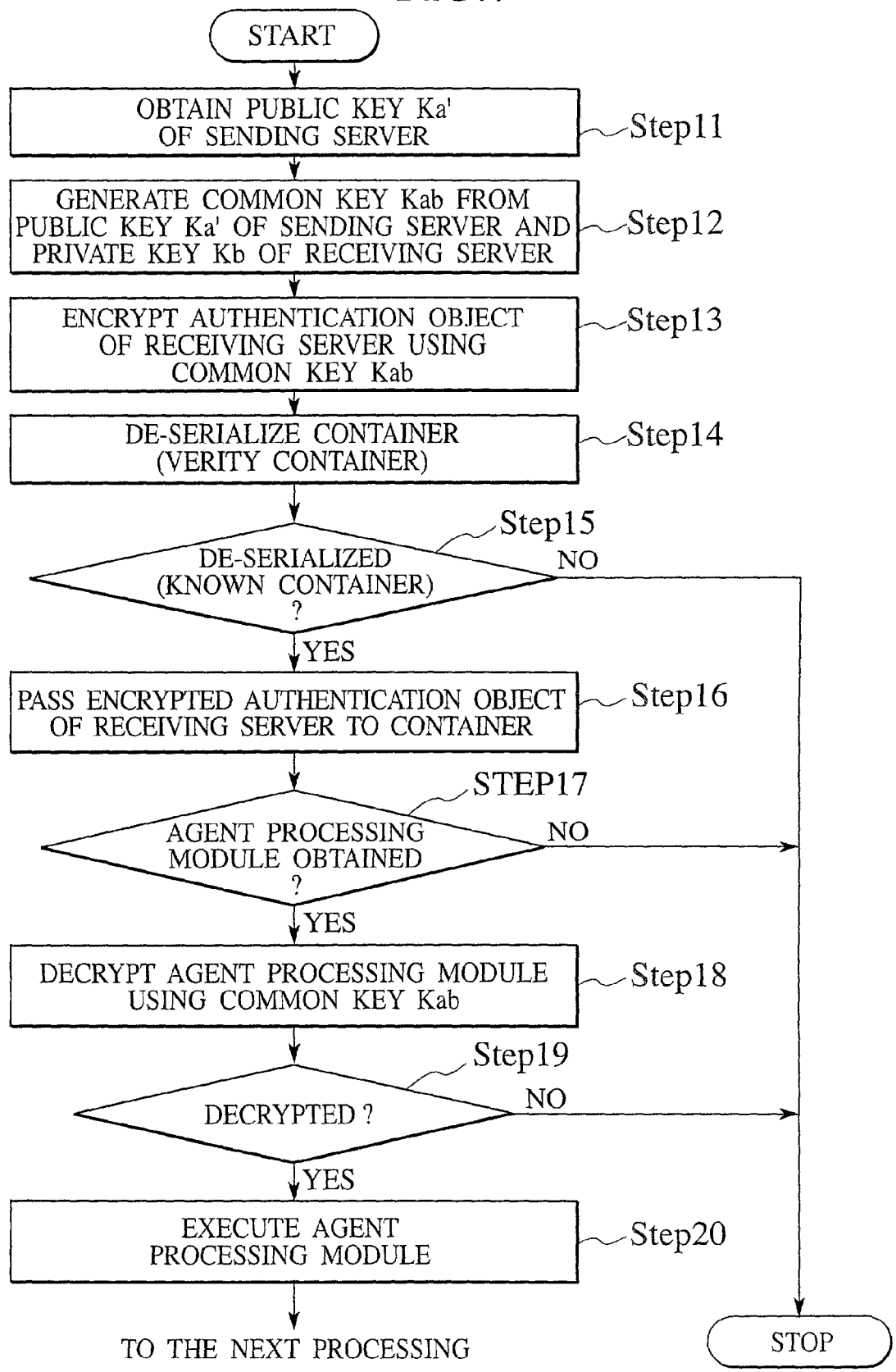
FIG. 7 is a processing flowchart showing the processing operation procedure of the receiving server shown in FIG. 6.

FIG. 6 is a diagram schematically showing the processing operation of the receiving server 30 that receives an agent sent from the sending server 20. FIG. 7 is a flowchart showing the processing flow. FIG. 8 is a flowchart showing the processing flow of the agent storage container 50 in the receiving server 30.

When the receiving server 30 receives the agent storage container 50, it obtains the public key Ka' of the sending server 20 from the public key server 10 (Step 11) and, with the use the DH system, generates the common key Kab from the obtained public key Ka' of the sending server 20 and the private key Kb of the receiving server 30 (Step 12). When the receiving server 30 receives the agent storage container 50, it may identify the sending server 20 by the IP address of the sender (sending server 20) or through login processing that is performed.

The receiving server 30 uses the generated common key Kab to DES-encrypt the authentication object 31 necessary to authenticate the receiving server 30 (Step 13).

On the other hand, the receiving server 30 de-serializes the received agent storage container 50, based on the container information 5 distributed in advance (Step 14). In this case, if the container is de-serialized normally, the receiving server 30 regards the agent storage container 50 as a known container and passes control to the step that follows. If the container is not de-serialized normally, the receiving server 30 regards the agent storage container 50 as an unknown container (that is, an unauthentic container), stops the processing, and rejects the reception of the agent storage container 50 (Step 15).

Next, the receiving server 30 passes the authentication object 31a, encrypted in step 13, to the agent storage container 50 (Step 16), and requests the agent storage container 50 to return the agent processing module 22a generated by decrypting the module encrypted by the unpublicized encryption method. That is, the receiving server 30 passes the encrypted authentication object 31a to the agent storage container 50 and requests the agent storage container 50 to verify the authentication object 31a, to decrypt the agent processing module 22b encrypted by the unpublicized encryption method, and to return the decrypted module.

When the agent storage container 50 receives the encrypted authentication object 31a from the receiving server 30, the agent storage container 50 uses the common key Kab therein (stored in the agent storage container 50) to DES-decrypt the encrypted authentication object 31a (Step 31).

If the encrypted authentication object 31a cannot be decrypted using the common key Kab stored in the agent storage container 50, the agent storage container 50 regards the encrypted authentication object 31a as an unauthentic object, that is, regards the receiving server 30 as an unauthentic server, and stops the processing (Step 32).

If the encrypted authentication object 31a can be decrypted using the common key Kab stored in the agent storage container 50, the agent storage container 50 compares the decrypted authentication object 31 with the authentication object information 21 stored in the agent storage container 50 for verification (Step 33). If, as a result of comparison, the decrypted authentication object 31 does not match the authentication object information 21 stored in the agent storage container 50, the agent storage container 50 regards the authentication object 31 as an unauthentic object, that is, regards the receiving server 30 as an unauthentic server, and stops the processing (Step 34).

If the decrypted authentication object 31 is authenticated, that is, if information on the receiving server 30 is obtained form the decrypted authentication object 31 and it is found that the obtained information matches the information on the receiving server that was set in the sending server 20 in advance, the double-encrypted agent processing module 22b is decrypted using the decryption processing program 23 stored in the agent storage container 50 to decrypt the module encrypted using the unpublicized algorithm (Step 35). Then, the decrypted agent processing module 22a is passed to the receiving server 30 (Step 36).

The receiving server 30 DES-decrypts the agent processing module 22a, passed from the agent storage container 50, using the common key Kab (Step 18). If the agent processing module 22a cannot be decrypted using the common key Kab, the receiving server 30 regards the agent as an unauthentic agent and stops the processing (Step 19).

The validity of the decrypted agent processing module 22a may also be verified by referring to the checksum or CRC check character or to the information such as the name of the module or method included in the physical program.

The above processing procedure allows the receiving server 30 to authenticate the agent, and the agent to authenticate the receiving server 30, each other and as a result, the receiving server 30 permits the agent to perform the processing of the decrypted agent processing module 22 (Step 20).

As described above, the sending server 20 that sends an agent and the receiving server 30 that receives the agent share the common key Kab, and the agent processing module 22 is double encrypted. The agent storage container 50, which contains the agent processing module 22b the agent processing module decryption processing program 23, receiving server authentication processing module 24, authentication object information 21, and the common key Kab, is transferred from the sending server 20 to the receiving server 30 to allow the agent and the receiving server to authenticate each other in the receiving server 30.

Therefore, the receiving server 30 that receives an agent can make two checks, that is, (1) verify the validity of the agent storage container 50 and (2) verify the validity of the agent processing module 22, easily and reliably, thus preventing an illegal access even if a malignant agent visits the server.

In addition, the agent processing module 22 is double-encrypted and, until the agent is authenticated by the destination server, the agent processing module remains encrypted by an unpublicized encryption method. Therefore, even if the agent visits a malignant server, security is maintained.

While the preferred embodiments of the present invention have been described in detail, it is to be understood that the present invention is not limited to those embodiments but that various modifications and changes may be made without departing from the spirit of the present invention.

For example, although an encryption system using a public key shared in accordance with the DH system is used as the model in this above description, an encryption algorithm in some other system may also be used to execute the authentication method.

The processing procedure for executing the authentication method according to the present invention may be saved on a recording medium as a computer program. The method described above may be executed by having a computer system read this recording medium to execute the program that executes the authentication method described above under computer control. The recording medium includes a medium that can be mounted on a device on which a program may be recorded and from which a program may be read, such as a memory device, a magnetic disc unit, and a magneto-optic disc.

What is claimed is:

1. An authentication method for use in an agent system including an agent processing module that leaves user's control and autonomically moves on a network and that executes predetermined processing on a destination server, wherein,
   (1) a sending server that sends the agent processing module
      (a) generates a common key from a private key owned by said sending server and a public key of a receiving server that receives the agent processing module,
      (b) encrypts the agent processing module, which will be sent, using the generated common key,
      (c) double-encrypts the encrypted agent processing module using an unpublicized encryption method,
      (d) stores the double-encrypted agent processing module, a decryption processing program that decrypts the agent processing module encrypted by the unpublicized encryption method, pre-distributed authentication object information on an authentication object of said receiving server, an authentication object verification processing program that verifies the authentication object of said receiving server, and the common key into an agent storage container defined in container information pre-distributed in said receiving server, and
      (e) sends the agent storage container to said receiving server, and
   (2) said receiving server
      (a) receives the agent storage container sent by said sending server,
      (b) verifies the received agent storage container based on the pre-distributed container information,
      (c) generates a common key from a private key owned by said receiving server and a public key of said sending server that sends the agent processing module,
      (d) encrypts the authentication object of said receiving server using the generated common key,
      (e) passes the encrypted authentication object to the agent storage container and requests the agent storage container to verify the authentication object, to decrypt the agent processing module encrypted by the unpublicized encryption method, and to return the decrypted agent processing module, and
      (f) decrypts the agent processing module, which is passed from the agent storage container, using the common key.

2. The authentication method for use in an agent system according to claim 1,
   wherein the authentication object verification processing program in the agent storage container decrypts the encrypted authentication object of said receiving server using the common key in the agent storage container, said encrypted authentication object being passed from said receiving server, and verifies the decrypted authentication object using the authentication object information in the agent storage container and
   wherein, if the decrypted authentication object matches the authentication object information in the agent storage container as a result of the verification, the decryption processing program in the agent storage container decrypts the agent processing module in the agent storage container using the unpublicized encryption method and passes the decrypted agent processing module to said receiving server.

3. The authentication method for use in an agent system according to claim 2, wherein, if the encrypted authentication object of said receiving server cannot be decrypted using the common key in the agent storage container, the authentication object verification processing program stops processing.

4. The authentication method for use in an agent system according to claim 2, wherein, if the decrypted authentication object does not match the authentication object information in the agent storage container as a result of the verification, the authentication object verification processing program stops processing.

5. The authentication method for use in an agent system according to claim 1, wherein, if said receiving server that has passed the encrypted authentication object to the agent storage container cannot obtain the agent processing module from the agent storage container, said receiving server stops processing.

6. The authentication method for use in an agent system according to claim 1, wherein, if said receiving server cannot decrypt the agent processing module, which is passed from the agent storage container, using the common key, said receiving server stops processing.

* * * * *